United States Patent
Lam et al.

(10) Patent No.: US 11,281,270 B2
(45) Date of Patent: *Mar. 22, 2022

(54) SUPPLY MARGINING METHOD AND APPARATUS

(71) Applicant: Intel Corporation, Santa Clara, CA (US)

(72) Inventors: Son Lam, Puyallup, WA (US); Henry W. Koertzen, Olympia, WA (US); Joseph T. Dibene, II, Olympia, WA (US); Steven D. Patzer, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/505,613

(22) Filed: Jul. 8, 2019

(65) Prior Publication Data

US 2020/0012327 A1    Jan. 9, 2020

Related U.S. Application Data

(63) Continuation of application No. 14/863,393, filed on Sep. 23, 2015, now Pat. No. 10,353,449, which is a continuation of application No. 14/090,519, filed on Nov. 26, 2013, now Pat. No. 9,223,367, which is a continuation of application No. 12/060,057, filed on Mar. 31, 2008, now Pat. No. 8,601,292.

(51) Int. Cl.
*G06F 1/32* (2019.01)
*G06F 1/26* (2006.01)
*G06F 1/3203* (2019.01)
*G06F 1/3234* (2019.01)
*G05F 1/66* (2006.01)

(52) U.S. Cl.
CPC .............. *G06F 1/266* (2013.01); *G05F 1/66* (2013.01); *G06F 1/26* (2013.01); *G06F 1/3203* (2013.01); *G06F 1/3243* (2013.01); *Y02D 10/00* (2018.01)

(58) Field of Classification Search
CPC ........ G06F 1/3202; G06F 1/3231; G06F 1/26; G06F 1/206; G06F 1/3228; G06F 1/08; G06F 1/3289; G06F 1/266; H04L 12/12; H04L 12/10

See application file for complete search history.

(56) References Cited

U.S. PATENT DOCUMENTS

| | | | |
|---|---|---|---|
| 7,456,617 B2 | 11/2008 | Chapuis et al. | |
| 7,523,337 B2 * | 4/2009 | Borkar | G06F 1/28 702/61 |
| 2004/0123171 A1 * | 6/2004 | Zhang | G06F 1/26 713/322 |

(Continued)

OTHER PUBLICATIONS

Advisory Action dated Sep. 21, 2018 for U.S. Appl. No. 14/863,393.

(Continued)

*Primary Examiner* — Zahid Choudhury
(74) *Attorney, Agent, or Firm* — Schabe, Williamson & Wyatt, P.C.

(57) ABSTRACT

In accordance with some embodiments, margining routines to determine acceptable voltage command values for specific CPU implementations at one or more different operating levels may be provided.

24 Claims, 5 Drawing Sheets

(56) References Cited

U.S. PATENT DOCUMENTS

2007/0070673 A1    3/2007  Borkar et al.
2008/0307240 A1*  12/2008  Dahan .................. G06F 1/3203
                                                              713/320

OTHER PUBLICATIONS

Final Office Action dated Jan. 10, 2019 for U.S. Appl. No. 14/863,393.
Final Office Action dated Jul. 12, 2018 for U.S. Appl. No. 14/863,393.
Non Final Office Action for U.S. Appl. No. 14/863,393, dated Dec. 14, 2017.
Non-Final Office Action dated Nov. 29, 2018 for U.S. Appl. No. 14/863,393.

* cited by examiner

SUPPLY MARGINING METHOD AND APPARATUS

CLAIM OF PRIORITY

This application is a continuation of, and claims priority to, U.S. patent application Ser. No. 14/863,393, filed Sep. 23, 2015, titled "Supply Margining Method and Apparatus", issued as U.S. Pat. No. 10,353,449 on Jul. 16, 2019, which is a continuation of, and claims priority to, U.S. patent application Ser. No. 14/090,519, filed on Nov. 26, 2013, titled "SUPPLY MARGINING METHOD AND APPARATUS," issued as U.S. Pat. No. 9,223,367 on Dec. 29, 2015, which is a continuation of, and claims priority to U.S. patent application Ser. No. 12/060,057, filed on Mar. 31, 2008, titled "SUPPLY MARGINING METHOD AND APPARATUS", issued a U.S. Pat. No. 8,601,292 on Dec. 3, 2013, all of which are incorporated herein by reference in their entirety for all purposes.

BACKGROUND

FIG. 1 shows a conventional implementation of a voltage regulator 102 coupled to a CPU 104 to provide it with a regulated voltage supply $V_R$. The CPU requests a desired voltage by way of a voltage identification (VID) command to the VR 102. The voltage that it actually receives ($V_{in}$), however, will be less than that generated by the VR due to a voltage drop across the loadline, represented by resistor block R. This resistance includes the output resistance from the voltage regulator, as well as resistances from the connections (pins, contacts, traces, etc.) from the regulator to the CPU.

The loadline resistance determines droop voltages for currents between minimum and maximum CPU loads. It also affects CPU maximum frequency (performance) and maximum efficiency voltage/frequency. Accordingly, to ensure that the CPU can work adequately over expected temperature and process ranges of deviations, from device to device and environment to environment, a VID guardband is typically used to account for the worst-case loadline. Unfortunately, this can result in wasted power and/or lower maximum attainable performance. Thus, improved approaches would be desired.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

CPUs typically allocate voltage guardbands, on the upper end to avoid (or reduce) damage due to overshoot, and on the lower end to thwart system hang due to undershoot. The guardband normally takes into account worst case CPU and VR process, voltage, and temperature. In reality, however, in many situations, the actual worst case values for each component will rarely occur. It is even less likely that both worst cases will occur at the same time. Thus, better, more particularized guardband values for upper and/or lower operating load conditions can be attained and used for individual systems for their particular application workloads and environments.

In accordance with some embodiments, margining routines to determine acceptable voltage command values for specific CPU implementations at one or more different operating levels may be provided. For example, a margining routine may achieve enhanced performance from a voltage regulator that can provide sufficiently responsive operating parameters. With additional embodiments, margining routines to determine one or more guardband values for specific implementations may also be provided. With some of these embodiments, voltage regulators may be driven harder and/or power may be saved by not having to request excess supply voltage therefrom.

Figure 1:
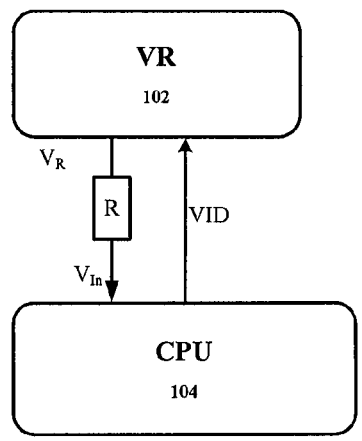
FIG. 1 is a diagram of a conventional arrangement of a voltage regulator coupled to supply power to a CPU.
Figure 2:
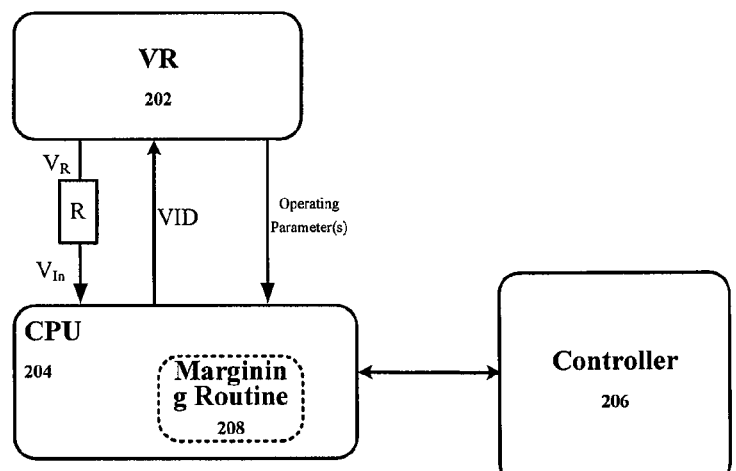
FIG. 2 is a diagram of a voltage regulator and a CPU with a margining routine in accordance with some embodiments.

FIG. 2 shows a voltage regulator 202 coupled to a CPU 204 to provide it with a regulated voltage supply ($V_R$), although the CPU actually receives a lesser voltage ($V_{in}$) due to the drop across the loadline R. Also shown is the SVID bus for the CPU to request a desired voltage and for receiving one or more operating parameter(s) (also referred to as telemetry information) from the regulator. A controller 206, such as a baseboard management controller (BMC), is controlled to issue a command to the CPU 204 to cause it to execute a margining routine 208 to determine appropriate VID levels based on monitored operating parameters.

Figure 3A:
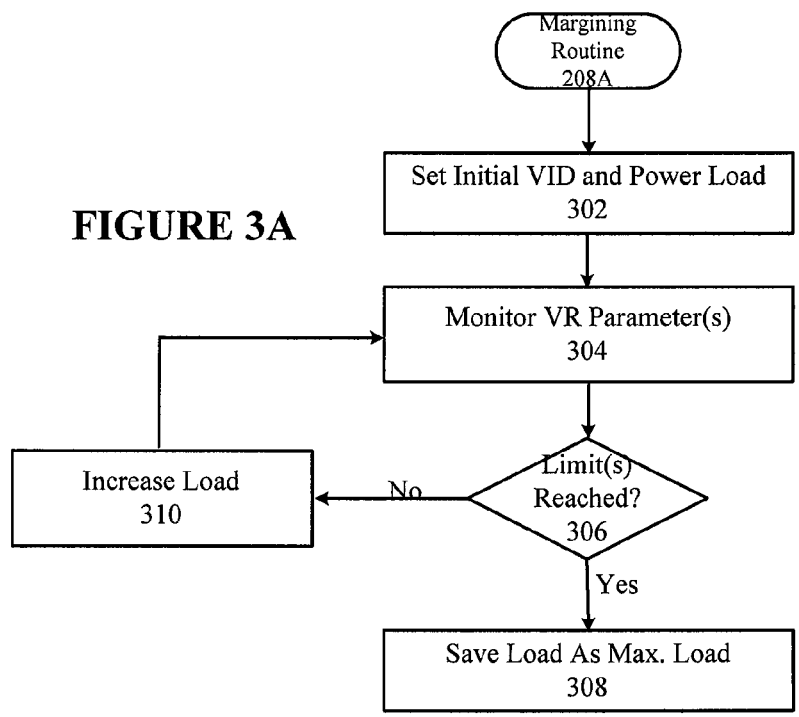
FIG. 3A shows a margining routine for setting a voltage regulator and CPU combination to operate under maximal (or near maximal) load conditions in accordance with some embodiments.
Figure 3B:
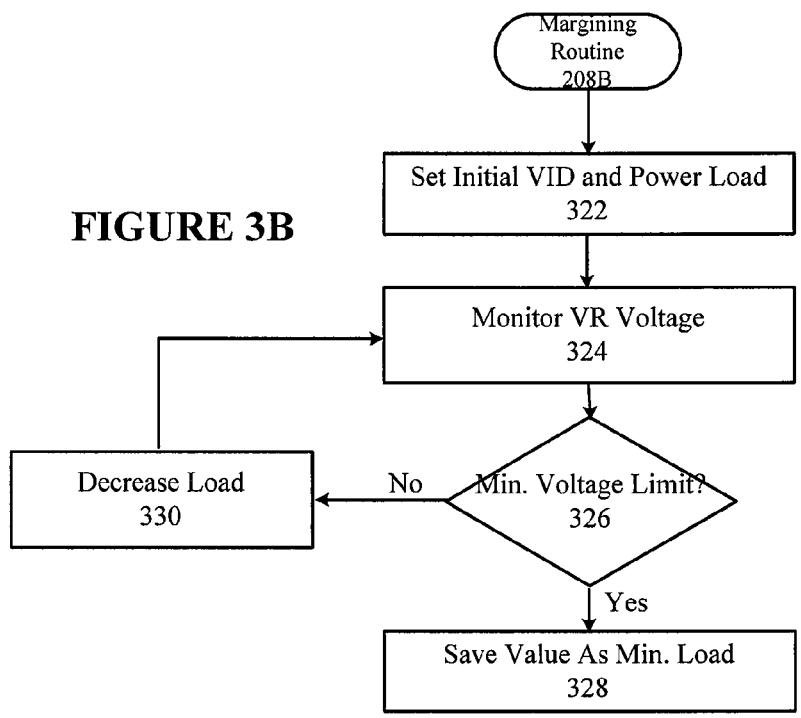
FIG. 3B is a flow diagram of a margining routine for determining operating limits for minimal (or near minimal) load conditions in accordance with some embodiments.

In some embodiments, the voltage regulator 202 is an integrated switching type regulator, e.g., a multi-phase switching buck-type regulator, with enough of its switching devices (transistors), inductors and capacitors integrated into a common package. With such sufficient integration, the switches may be switched at very high frequencies, e.g., in excess of 50 MHz. This allows for the operating parameter (s), e.g., supplied current, temperature, power, and the like, to be highly responsive to changes in the parameters. For example, operating parameter data may be responsive in excess of 200 nSec. sampling intervals. In turn, this allows for the margining routine 208 (through the CPU 204 or controller 206) to push CPU performance to the brink of the voltage regulator's capabilities. FIG. 3A shows a margining routine 208A for setting a voltage regulator and CPU combination to operate under maximal (or near maximal) load conditions, while FIG. 3B is a margining routine 208B for determining operating (e.g., VID) limits for minimal (or close to minimal) load conditions.

FIG. 3A shows a flow diagram of a margining routine 208 suitable for use, among other places, with the CPU 204 from FIG. 2. With this embodiment, an objective is to determine an extreme upper operating level for the VR in combination with the CPU in its given environment. The VR maker may establish maximum operating parameters such as short term and extended duration power, current, temperature, and the like. Traditionally, it (or another entity such as a PC maker) may have used a general VID guardband that ensured these parameters would not be exceeded. However, with more responsive parameter information from the VR such as described above, this guardband may effectively be "squeezed" for a given configuration and particularly squeezed even further for a given operating environment.

At 302, an initial VID and Frequency are set, and the CPU is driven with suitable software, e.g., suitable work load or benchmark application. In some embodiments, for example, the VID and frequency could be set to a Max Non-Turbo state. Regardless, in most situations, the value should be sufficiently low for encountered devices (e.g., being tested, adjusted, and/or verified) so that it doesn't start off with operating VR parameters exceeding specified limits. For example, with a CPU rated to operate up to 100 W at voltages ranging from 1.1 to 1.5 V, the initial VID might be for 1.3V with a load (determined by frequency and received $V_{in}$) of about 90 W.

At 304, the CPU (or test equipment through CPU and/or controller) monitors the VR operating parameters. For example, it could monitor any suitable combination of maximum voltage, thermal, TDP, TDC limits. At 306, if they are not exceeded, then the routine goes to 310 and increases the load (e.g., VID and/or frequency) and loops back to 304.

On the other hand, if at 306, it determines that the operating parameter(s) are exceeded, then it proceeds to 308 and saves the load (e.g., VID and/or frequency) value(s) (settings or setting) as a maximum operating load value(s). For this step, the value(s) may be burned into one or more fuses or stored in suitable non-volatile memory.

FIG. 3B shows a margining routine for determining a minimum load margin in accordance with some embodiments. At 322, an initial load is set. For example, the VID and frequency could be at a max. efficiency setting. The CPU can be driven with any suitable software such as a work load or benchmark application. At 324, the supplied voltage is monitored. This could be the VR voltage monitored from received VR parameter(s) or from a measured voltage, e.g., in the CPU.

At 326, it determines if the min. voltage limit is reached. If not, it proceeds to 330 and decreases the load (e.g., decreases VID and frequency) an from there, loops back to 324. Otherwise, it goes to 328 and saves the load setting (e.g., VID and frequency) as a minimum load setting.

Figure 4:
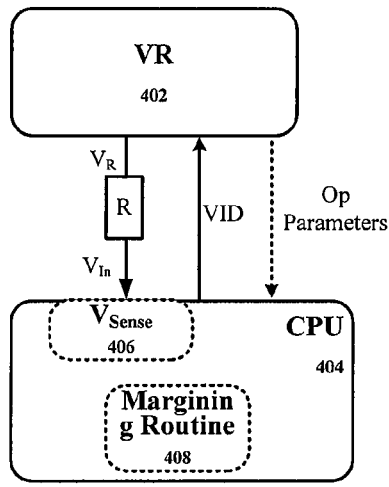
FIG. 4 is a diagram of a voltage regulator with a CPU having a voltage sensor for implementing a margining routine in accordance with some embodiments.
Figure 5:
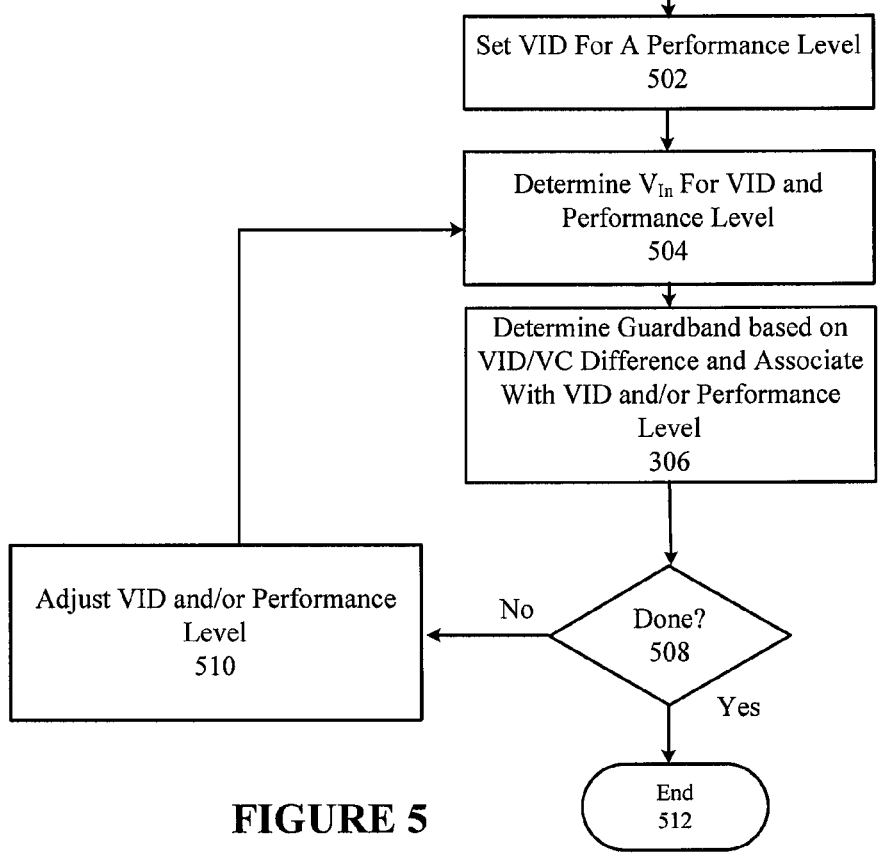
FIG. 5 is a margining routine in accordance with additional embodiments.

FIG. 4 shows another embodiment of a VR (402) and CPU (404) configuration. In this embodiment, the CPU comprises a margining routine 408. The voltage sensor 406 in the CPU 404 measures the regulated voltage received at the CPU. With such a voltage sensor, it can measure the received supply VIN, downstream from the loadline, so that a guard band better suited for a particular implementation can be determined, thereby allowing for the VID guard band to be reduced for most devices. This can save power at both the upper and lower ends of a CPU's operating voltage range. FIG. 5 is a margining routine 408 for determining acceptable VID values or ranges for a particular CPU and VR configuration, e.g., in a given environment, in accordance with some embodiments. Initially, at 502, a VID is set for a given performance level, e.g., with a certain CPU frequency, voltage, and processing task. Next, the received supply voltage (Vin) is determined (e.g., measured from voltage sensor 406). Next, at 506, a guard band for these values is determined based on the difference between the requested VR and received Yin. This determined guard band (or difference) is associated and saved with the VID and/or performance level used for the determination.

At 508, the routine determines if it is done. For example, it could check to see if enough values over a wide enough range have been obtained, or another approach could be used. If it is not finished, then it proceeds to 510 and adjusts the VID and/or performance level. From here, it returns to 504 and executes as already discussed.

Thus, with this routine, many different data points can be taken over a range of performance levels and over a range of VID levels. On the other hand, it could be use to determine guardband for a limited range, e.g., upper VID levels, e.g., at demanding performance states or lower VID levels at lower performance states. In addition, the measured and/or determined (calculated, estimated, etc.) guardband levels for use in later operation can be determined in many different ways. For example, over the range of different values obtained from the routine just described, a worse-case value could be used, or alternatively, different values could be used (e.g., by way of a look-up table) for different operating steps (or sub-ranges).

Figure 6:
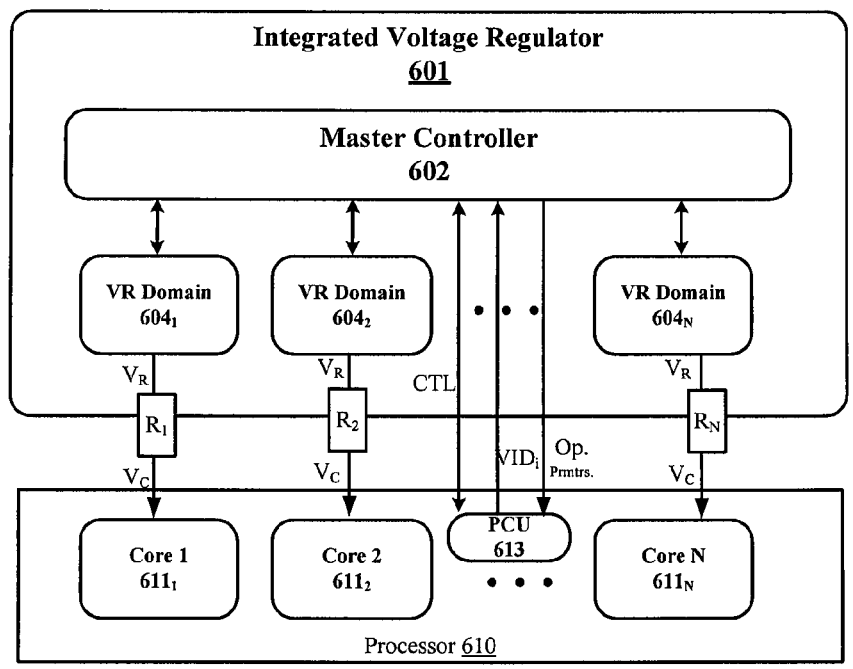
FIG. 6 is a diagram of a multi-domain regulator supplying power to a multi-core CPU having margining capabilities in accordance with some embodiments.

FIG. 6 shows an embodiment of an integrated voltage regulator 601 coupled to a multi-core CPU 610. Integrated Silicon Voltage Regulator (ISVR) technology involves the integration of a voltage regulator into the package. This includes the magnetic, capacitance, power switches, controllers, telemetry, and interfaces. Embodiments disclosed herein can be used with the ISVR telemetry (operating parameters) for dynamically adjusting the CPU loadline to save power during normal operation.

FIG. 6 shows an embodiment of a multi-cell IVR 601 coupled to a multi-core CPU 610 to provide it with regulated voltage supplies for associated cores ($611_1$) in a multi-core processor 610. The multi-cell IVR 601 has multiple VR domains 604 ($604_1$ to $604_N$), for example, each comprising multiple cells and being coupled to an associated core $611_i$ ($611_1$ to $611_N$) in the CPU 610. The IVR 601 also has a master controller 602 to control the IVR domains 604 to enable and disable cells within the domain based on information from the core loads, as well as from a power control unit (PCU) 613 in the CPU 610, which issues VID commands and receives operating parameter information for the separate core/domain combinations.

In some embodiments, the IVR 601 and processor 610 may be part of a common package, such as with the embodiment of FIG. 7, discussed below. With the dies from the VR and processor mounted proximal to one another, circuit elements for VR domains can be disposed more proximal to their associated core. This can allow for sufficiently low-resistive paths (e.g., via solder bumps or other contacts) to conduct relatively large amounts of current to the domain cores. Also, in some embodiments, the magnetic elements, capacitors, power switches, controllers, interfaces, and even telemetry elements (sensors, analog or digital signal lines, etc.) to provide the operating parameters are contained within the same package, which among other things, allows for greater switching speeds and thus, increased telemetry (operating parameter) responsiveness. It also provides for the operating parameter signals to be more accurate because the interconnectivity can be shorter and subject to a more stable temperature environment (e.g., changes similarly within VR and CPU).

Figure 7:
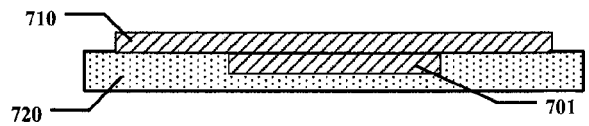
FIG. 7 is a side view of a multi-domain regulator and multi-core CPU package in accordance with some embodiments.

FIG. 7 shows a cross-sectional view of a multi-core microprocessor (such as the processor of FIG. 6) integrated circuit (IC). It comprises a multi-cell integrated voltage regulator (IVR) die 701 and a multi-core microprocessor die 710 coupled together as shown. The IVR die 701 is embedded within a package substrate 720, while the microprocessor die is mounted to the substrate 720 and against the IVR die 701 for efficient signal connectivity. In this embodiment, the substrate 720 serves as a package substrate for both the processor 610 and IVR 601. Note that the dies may or may not actually contact one another. They may have one or more other materials sandwiched between them throughout some or all of their abutting surface portions. Such materials could be used for structural stability, heat transfer purposes, power and signal grids, or the like. Moreover, it should be appreciated that any suitable package configuration using one or more dies to implement the domain cores and VR may be implemented and are within the scope of the present invention. For example, the IVR die could be "atop" the microprocessor die instead of "below" it. Alternatively it could be next to it, partially against it, or they could be part of the same die.

Figure 8:
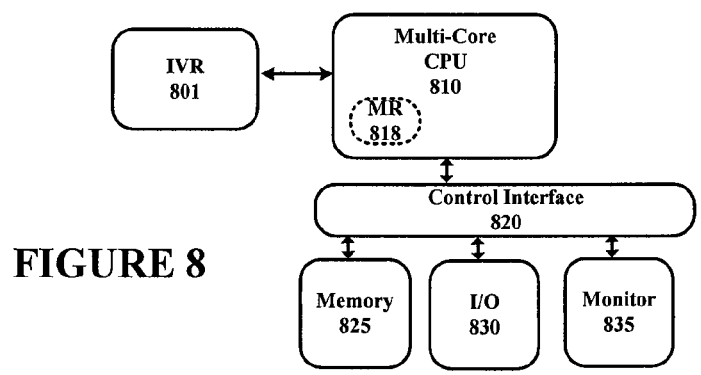
FIG. 8 is a diagram of a portion of a computer system with a CPU and voltage regulator with margining capability in accordance with some embodiments.

With reference to FIG. 8, one example of a portion of a computer platform (e.g., computing system such as a desktop or server computer, PDA, cell phone, or the like) is shown. The represented portion comprises one or more CPU's 810, integrated voltage regulator (IVR) 801, control interface 820, memory 825, I/O devices 830, and monitor 835, coupled as shown. The CPU 810 is coupled to the memory 825, I/O devices 830, and monitor 835 through the control interface 820. The CPU comprises a margining routine 818, as discussed herein, to determine particular VID ranges and/or values for a particular computing platform implementation. The control interface may comprise one or more circuit blocks to perform various interface control functions (e.g., memory control, graphics control, I/O interface control, and the like. These circuits may be implemented on one or more separate chips and/or may be partially or wholly implemented within the CPU 810.

The memory 825 comprises one or more memory blocks to provide additional random access memory to the CPU 810. It may be implemented with any suitable memory including but not limited to dynamic random access memory, static random access memory, flash memory, combinations of the same, or the like. The I/O devices comprise any devices such as keyboards, mousse, printers, audio input/output devices and the like to allow a user to input data into and perceive data out from the CPU 810. The monitor 835 may comprise any monitor such as a liquid crystal display (LCD) or the like for presenting a visual image to a user.

In the preceding description, numerous specific details have been set forth. However, it is understood that embodiments of the invention may be practiced without these specific details. In other instances, well-known circuits, structures and techniques may have not been shown in detail in order not to obscure an understanding of the description. With this in mind, references to "one embodiment", "an embodiment", "example embodiment", "various embodiments", etc., indicate that the embodiment(s) of the invention so described may include particular features, structures, or characteristics, but not every embodiment necessarily includes the particular features, structures, or characteristics. Further, some embodiments may have some, all, or none of the features described for other embodiments.

In the preceding description and following claims, the following terms should be construed as follows: The terms "coupled" and "connected," along with their derivatives, may be used. It should be understood that these terms are not intended as synonyms for each other. Rather, in particular embodiments, "connected" is used to indicate that two or more elements are in direct physical or electrical contact with each other. "Coupled" is used to indicate that two or more elements co-operate or interact with each other, but they may or may not be in direct physical or electrical contact.

The invention is not limited to the embodiments described, but can be practiced with modification and alteration within the spirit and scope of the appended claims. For example, it should be appreciated that the present invention may be applicable for use with all types of semiconductor integrated circuit ("IC") chips. Examples of these IC chips include but are not limited to processors, controllers, chip set components, programmable logic arrays (PLA), memory chips, network chips, and the like.

It should also be appreciated that in some of the drawings, signal conductor lines are represented with lines. Some may be thicker, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

It should be appreciated that example sizes/models/values/ranges may have been given, although the present invention is not limited to the same. As manufacturing techniques (e.g., photolithography) mature over time, it is expected that devices of smaller size could be manufactured. In addition, well known power/ground connections to IC chips and other components may or may not be shown within the FIGS, for simplicity of illustration and discussion, and so as not to obscure the invention. Further, arrangements may be shown in block diagram form in order to avoid obscuring the invention, and also in view of the fact that specifics with respect to implementation of such block diagram arrangements are highly dependent upon the platform within which the present invention is to be implemented, i.e., such specifics should be well within purview of one skilled in the art. Where specific details (e.g., circuits) are set forth in order to describe example embodiments of the invention, it should be apparent to one skilled in the art that the invention can be practiced without, or with variation of, these specific details. The description is thus to be regarded as illustrative instead of limiting.

What is claimed is:

1. An apparatus comprising:
   a first voltage regulator (VR) portion to provide a first power supply voltage via a first rail to a first power domain, wherein the first VR portion is further to provide an initial power supply to the first power domain prior to providing the first power supply voltage, wherein the initial power supply voltage has a voltage level lower than the first power supply voltage;
   a second VR portion to provide a second power supply voltage via a second rail to a second power domain separate from the first power domain;

a first interface to receive a voltage command request from a processor, wherein the voltage command request is to set a power supply delivered by at least one of the first and second VR portions; and a second interface to provide telemetry information associated with at least one of the first and second VR portions to the processor, wherein the telemetry information is provided on the second interface separate from the first supply rail and the second supply rail.

2. The apparatus of claim 1, wherein the telemetry information includes voltage and current information.

3. The apparatus of claim 1, further comprising one or more circuits to monitor temperature of at least one of the first and second VR portions.

4. The apparatus of claim 1, further comprising logic shared between the first and second VR portions.

5. The apparatus of claim 1, wherein the first power domain is at least a portion of a processor.

6. The apparatus of claim 1, wherein the first and second power domains are part of a processor.

7. The apparatus of claim 1, wherein the first VR portion to be coupled to an inductor.

8. A processor comprising:
a voltage regulation circuitry; and
a CPU to be coupled to the regulator to provide the CPU with a voltage command; wherein the CPU is to:
receive a supply voltage, via a supply rail, from the voltage regulation circuitry corresponding to the commanded voltage;
receive telemetry information from the voltage regulation circuitry, wherein the telemetry information is provided on an interface separate from the supply rail; and
determine allowable voltage command values for later operation based on the telemetry information;
wherein the voltage regulation circuitry is to provide an initial power supply for a period of time, and thereafter provide the supply voltage.

9. The apparatus of claim 8, wherein the telemetry information includes voltage and current information.

10. The apparatus of claim 8, wherein the voltage regulation circuitry includes a circuitry to monitor temperature of a voltage regulator of the voltage regulation circuitry.

11. A system comprising:
a processor; and
a voltage regulation circuitry coupled to the processor, wherein the voltage regulation circuitry including:
a first voltage regulator (VR) portion to provide a first power supply voltage via a first rail to a first power domain of the processor, wherein the first VR portion is further to provide an initial power supply to the first power domain prior to providing the first power supply voltage, wherein the initial power supply voltage has a voltage level lower than the first power supply voltage;
a second VR portion to provide a second power supply voltage via a second rail to a second power domain of the processor separate from the first power domain;
a first interface to receive a voltage command request from the processor, wherein the voltage command request is to set a power supply delivered by at least one of the first and second VR portions; and
a second interface to provide telemetry information associated with at least one of the first and second VR portions to the processor, wherein the telemetry information is provided on the second interface separate from the first supply rail and the second supply rail.

12. The system of claim 11, wherein the telemetry information includes voltage and current information.

13. The system of claim 11, further comprising one or more circuits to monitor temperature of at least one of the first and second VR portions.

14. The system of claim 11, further comprising logic shared between the first and second VR portions.

15. The system of claim 11, wherein the first power domain is at least a portion of a processor.

16. The system of claim 11, wherein the first and second power domains are part of a processor.

17. The system of claim 11, wherein the first VR portion to be coupled to an inductor.

18. A voltage regulator (VR) apparatus comprising:
a first VR section to provide a first power supply voltage and current to a first power domain, wherein the first VR section is further to provide a preliminary first power supply voltage to the first power domain, wherein the preliminary first power supply voltage has a voltage level lower than the first power supply voltage;
a second VR section to provide a second power supply voltage and current to a second power domain separate from the first power domain;
a first interface to receive a voltage command request from a processor, wherein the voltage command request is to set a power supply voltage or current suppled by the first VR section and/or the second VR section;
a second interface separate from the first interface, wherein the second interface is a non-power supply rail, wherein the second interface is to provide telemetry information of the first VR section and/or the second VR section to the processor; and
one or more circuitries to determine a temperature of the first VR section and/or the second VR section, and to provide the temperature to the processor.

19. The VR apparatus of claim 18, wherein the first VR section is coupled to an inductor.

20. The VR apparatus of claim 18, wherein the telemetry information includes voltage and current information.

21. A method comprising:
receiving an initial power supply voltage from a voltage regulation circuitry for a period of time;
receiving, after receiving the initial power supply voltage, a supply voltage, via a supply rail, from the voltage regulation circuitry, wherein the supply voltage corresponds to a commanded voltage;
receiving telemetry information from the voltage regulation circuitry, wherein the telemetry information is provided on an interface separate from the supply rail; and
determining allowable voltage command values for later operation based on the telemetry information.

22. The method of claim 21, further comprising receiving temperature of a voltage regulator of the voltage regulation circuitry.

23. The method of claim 21, wherein the telemetry information includes voltage and current information.

24. The method of claim 21, wherein the voltage regulation circuitry includes a circuitry to monitor temperature of a voltage regulator of the voltage regulation circuitry.

* * * * *